(12) United States Patent
Henderson et al.

(10) Patent No.: US 6,877,797 B2
(45) Date of Patent: Apr. 12, 2005

(54) COMPOSITE COMPONENT INTEGRATION PANEL FOR A MOTOR VEHICLE

(75) Inventors: Jack V. Henderson, West Bloomfield, MI (US); Charles John Chuba, Farmington Hills, MI (US); John Schultz, St. Clair Shores, MI (US); Keijo J. Huotari, Fenton, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/483,364
(22) PCT Filed: Jul. 18, 2002
(86) PCT No.: PCT/CA02/01095
§ 371 (c)(1),
(2), (4) Date: Jan. 9, 2004
(87) PCT Pub. No.: WO03/008256
PCT Pub. Date: Jan. 30, 2003

(65) Prior Publication Data
US 2004/0174047 A1 Sep. 9, 2004

Related U.S. Application Data
(60) Provisional application No. 60/306,331, filed on Jul. 18, 2001, and provisional application No. 60/329,366, filed on Oct. 15, 2001.

(51) Int. Cl.$^7$ .............................................. B60R 27/00
(52) U.S. Cl. ........................ 296/203.02; 296/193.09; 296/193.1
(58) Field of Search ...................... 296/203.02, 193.09, 296/193.1

(56) References Cited

U.S. PATENT DOCUMENTS

| | | |
|---|---|---|
| 5,077,885 A | 1/1992 | Kanemitsu et al. |
| 5,123,695 A | 6/1992 | Kanemitsu et al. |
| 5,271,473 A | 12/1993 | Ikeda et al. |
| 5,358,304 A | 10/1994 | Kanemitsu et al. |
| 5,409,288 A | 4/1995 | Masuda |
| 5,658,041 A | 8/1997 | Girardot et al. |
| 5,671,803 A | 9/1997 | Tepas et al. |
| 6,189,958 B1 | 2/2001 | Guyomard et al. |
| 6,196,624 B1 | 3/2001 | Bierjon et al. |
| 6,205,638 B1 | 3/2001 | Yustick |
| 6,216,810 B1 | 4/2001 | Nakai et al. |
| 6,273,496 B1 | 8/2001 | Guyomard et al. |
| 6,290,287 B1 | 9/2001 | Guyomard |
| 6,334,645 B1 | 1/2002 | Ban |
| 6,357,821 B1 * | 3/2002 | Maj et al. ............... 296/203.02 |
| 6,450,276 B1 * | 9/2002 | Latcau ................... 296/203.02 |
| 6,547,317 B1 * | 4/2003 | Cheron et al. ......... 296/203.02 |
| 2001/0010275 A1 | 8/2001 | Sasano et al. |
| 2001/0011614 A1 | 8/2001 | Sasano et al. |
| 2001/0026081 A1 | 10/2001 | Ozawa et al. |
| 2001/0026082 A1 | 10/2001 | Ozawa et al. |
| 2001/0045761 A1 | 11/2001 | Ozawa et al. |
| 2001/0050160 A1 | 12/2001 | Ozawa et al. |

FOREIGN PATENT DOCUMENTS

| | | |
|---|---|---|
| DE | 199 46 349 A1 | 9/1999 |
| EP | 1 048 554 A2 | 2/2000 |
| EP | 1 036 729 A1 | 3/2000 |
| FR | WO 00/18636 | 4/2000 |
| WO | PCT/FR99/02305 | 9/1999 |

* cited by examiner

*Primary Examiner*—Lori L. Coletta
(74) *Attorney, Agent, or Firm*—Clark Hill PLC

(57) ABSTRACT

A panel assembly is securable to a front end of a motor vehicle for positioning and securing a plurality of elements thereto. The panel assembly has a core connectable to the front end of a motor vehicle. A skin covers the core. A component mounting structure is molded to the skin. The component mounting structure is adapted to have the plurality of elements attached thereto in spaced relation. The panel assembly may be assembled to the motor vehicle with the plurality of elements secured thereto.

5 Claims, 3 Drawing Sheets

COMPOSITE COMPONENT INTEGRATION PANEL FOR A MOTOR VEHICLE

This application claims the benefit of provisional application No. 60/306,331, filed Jul. 18, 2001, and provisional application No. 60/329,366, filed Oct. 15, 2001.

FIELD OF THE INVENTION

The invention relates to a composite component integration panel for an automotive vehicle. More particularly, the invention relates to a front end assembly of a motor vehicle that integrates automotive components typically found in a forward section of a motor vehicle.

DESCRIPTION OF THE RELATED ART

A grille opening reinforcement (GOR) is one of the most important components of the front end of an automobile. A GOR is a molded piece having a Class "B" surface, i.e., a surface that is not visible when the motor vehicle is fully assembled. Components such as fenders, bumper covers, grilles, headlamps and the like are assembled to the GOR. The GOR provides attachments, locators and structural support to the components that are secured thereto. It also provides access for lamp bulb replacement, secondary hood latch release levers, and other maintenance and repair requirements.

The primary function of a GOR is to provide the assembly plants a controlled and predictable front-end composite structure for their vehicles. An original equipment manufacturer (OEM) typically incorporates the GOR into all of its designs because the fit and finish of all front-end exterior components are maintained at a high level with great precision. However, a disadvantage of GOR designs is that much of the structure of the GOR is duplicated by a similar structure, namely, the radiator support.

SUMMARY OF THE INVENTION

Accordingly, a panel is provided for front-end structure, crash management, and attaching components to a front end of a vehicle body. The panel eliminates duplication of structure between a conventional radiator structure and the GOR. The panel could be installed in either a body shop or trim line application. The trim line application would allow for additional component integration. For example, parts such as headlamps, park turn lamps, grille, radiator, fascia, fluid reservoirs, and air dams could first be assembled to the panel, thus forming a front-end module, which would then be attached to the body structure. Therefore, the panel would not have an impact on a traditional body shop build but more importantly would have the flexibility of added part consolidation.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
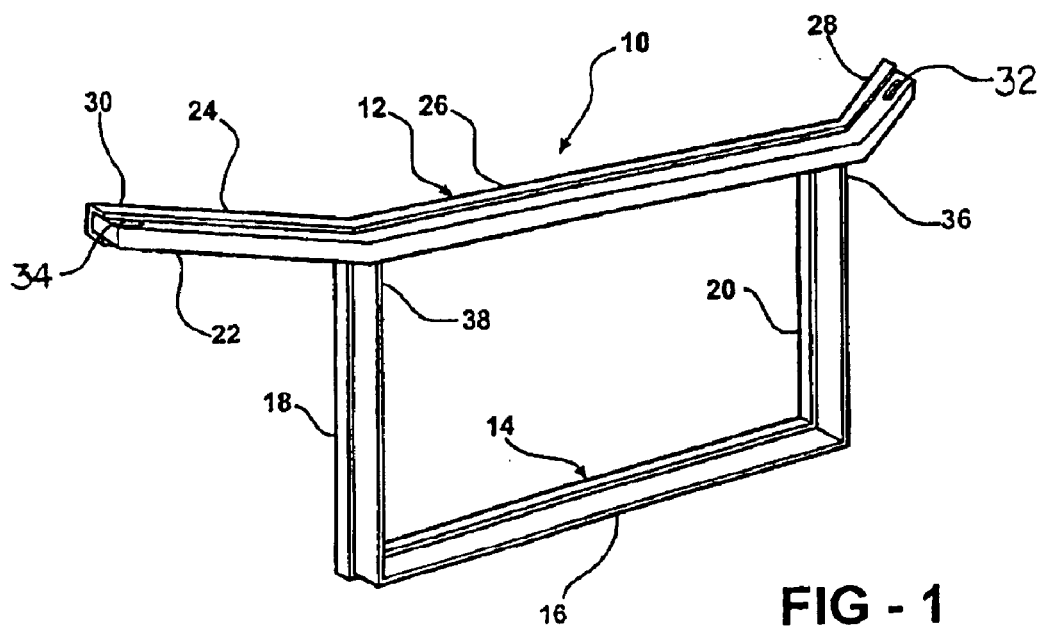
FIG. 1 is a perspective view of a first embodiment of the invention.

As shown in the Figures, wherein like primed numerals represent similar elements in different embodiments, a panel assembly of the present invention is generally indicated at 10. The panel assembly 10 is an open structural frame having an upper section 12 and a lower section 14. The lower section 14 includes a cross member 16 and two side members 18, 20 creating a U-shape. Each of the upper 12 and lower 14 sections has a core 22 and a skin 24. In the preferred embodiment, the core 22 is fabricated from balsa wood and the skin 24 is fabricated from a fiber resin matrix, such as a carbon fiber. The balsa wood core 22 is inserted into a mold, which is subsequently shot with the carbon fiber. The carbon fiber skin 24 is applied to the balsa core 22 and serves as a tensile member in impact situations.

The upper section 12 defines a length 26 that extends between a driver end 28 and a passenger end 30. The length 26 extends through a non-linear path in the preferred embodiment. Each of the driver 28 and passenger 30 ends include joint connections 32, 32", 34, 34", best seen in FIGS. 1 and 7. The joint connections 32, 32", 34, 34", will be discussed in greater detail subsequently.

The lower section 14 extends between an upper driver end 36 and an upper passenger end 38. More specifically, one of the side members 20 ends at the upper driver end 36 and the other of the side members 18 ends at the upper passenger end 38. The upper driver 36 and passenger 38 ends are fixedly secured to the length 26 of the upper section 12 between the driver 28 and passenger 30 ends thereof.

Figure 3:
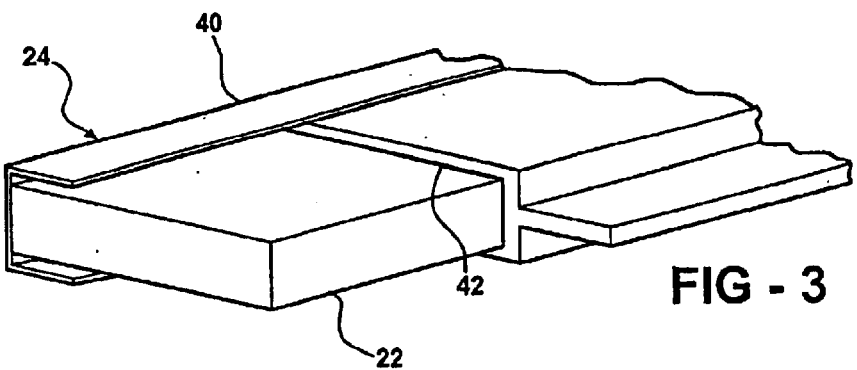
FIG. 3 is a partially cut-away perspective view of the first embodiment of the invention.
Figure 4:
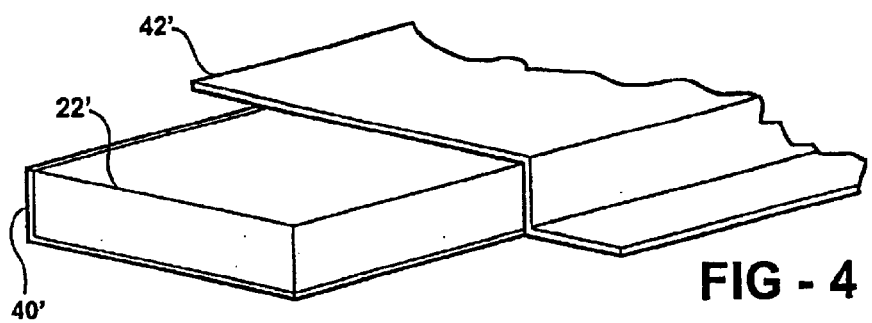
FIG. 4 is a partially cut-away perspective view of a second embodiment of the invention.
Figure 5:
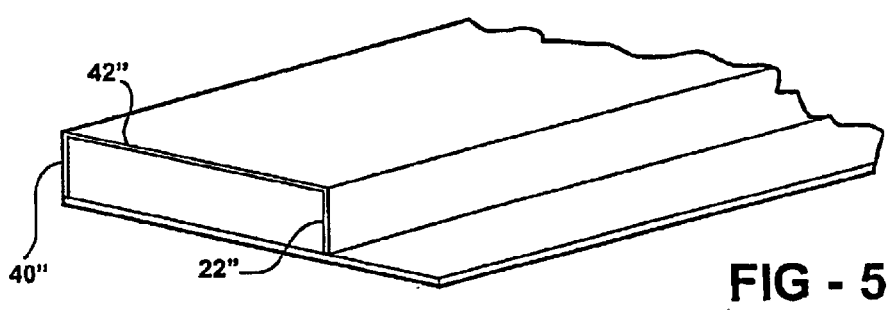
FIG. 5 is a partially cut-away perspective view of a third embodiment of the invention.
Figure 6:
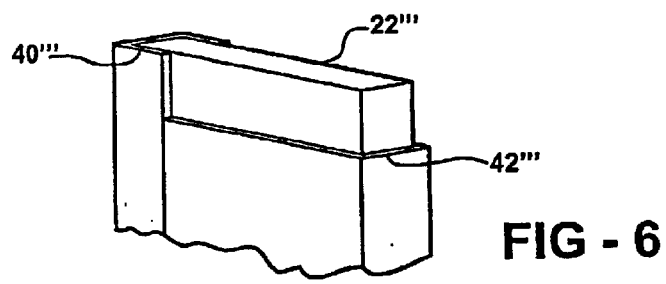
FIG. 6 is a partially cut-away perspective view of a fourth embodiment of the invention.

As detailed in FIG. 3, the carbon fiber skin 24 is shaped in a partial C-section. The C-section allows for increased structural integrity and facilitates wet out in the molding process. The carbon fiber skin 24 includes a first skin portion 40 and a second skin portion 42 that together envelop the core 22. This process of manufacture is via molding, as alluded to above.

Figure 2:
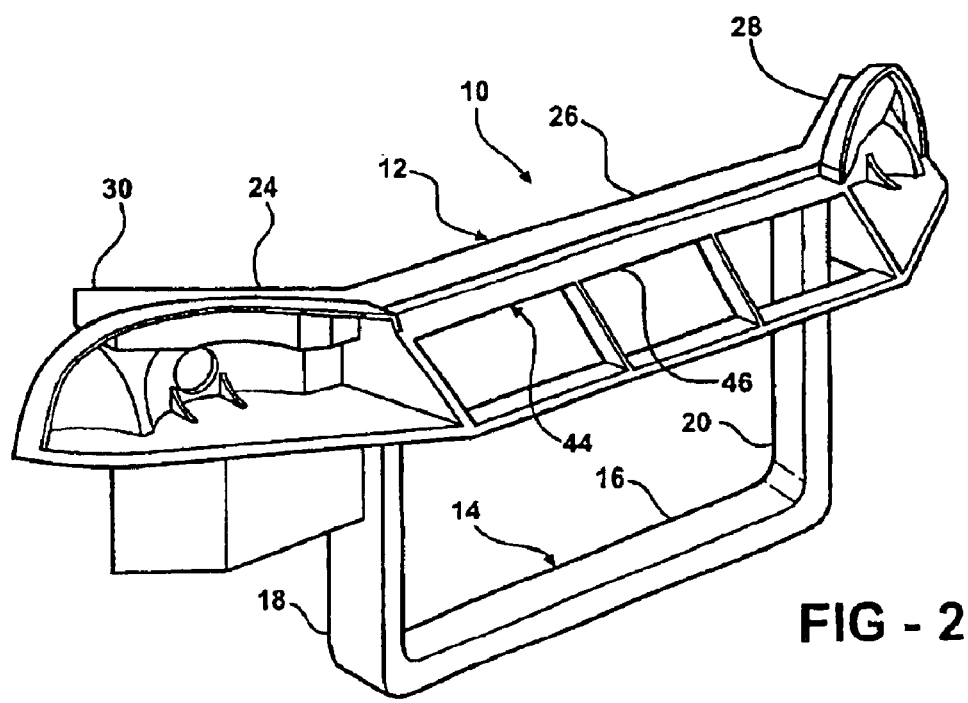
FIG. 2 is a perspective view of the first embodiment of the invention in complete form.

The panel assembly 10 is inserted into a compression mold, thus allowing for intricate shapes and attachment features to be molded in a component mounting structure 44, shown in FIG. 2. After the panel assembly 10 is inserted in the tool, a thermoplastic/glass reinforced material fills the mold via a compression or injection molding process. During the molding process, the thermoplastic/glass reinforced material is essentially in a liquid state, which allows for complete material distribution and wet out to the panel assembly 10. These aforementioned processes serve two main functions. First, the carbon fiber skin 24 and balsa wood core 22 are completely encapsulated (box section) with a structural skin 46. Second, module formation of the head lamp, fascia, grille, radiator, and body structure attachments can be performed away from assembly of a motor vehicle.

Calculations can demonstrate the composite panel's attributes as they relate to vehicle stiffness and crash worthiness are far superior to steel structural counterparts. The mass moment of inertia properties for the panel assembly 10 in the Z-direction, e.g., the direction of an impact, reap significant magnitudes of improvement in comparison to the impact directional mass moment of inertia properties of the steel structure.

A test was performed with the loading criteria input based on a 4500 pound vehicle subject to 40% offset/40 mile per hour deformable barrier impact. This test yielded a resultant point load (offset from vehicle centerline) of 50,000 pounds. Due to the ultimate tensile strength of steel being exceeded by the stress of the loading condition, the results yielded a catastrophic failure in the steel radiator structure. The comparison of deflection and stresses between the panel assembly 10 and the steel radiator structure demonstrates that the panel assembly 10 would significantly improve vehicle stiffness and crash worthiness.

Figure 7:
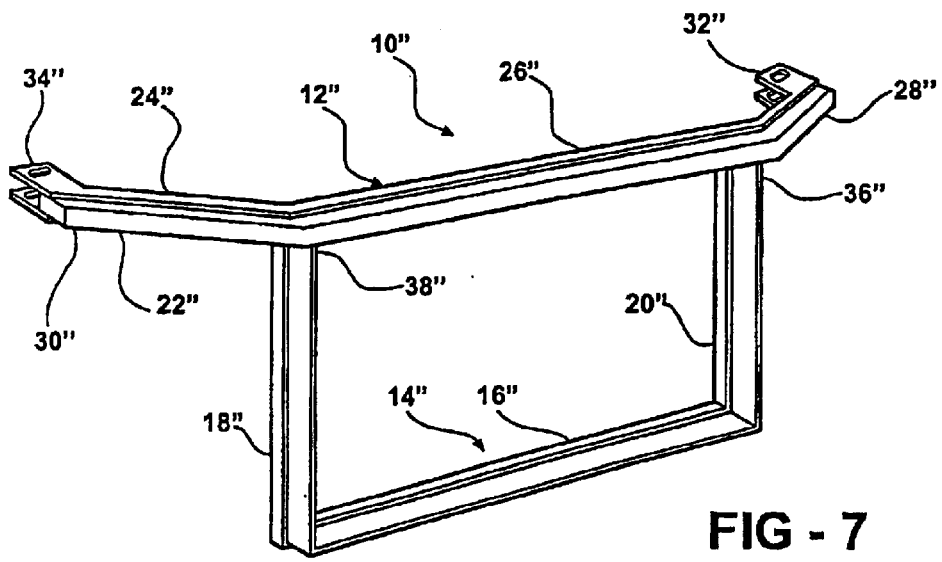
FIG. 7 is a perspective view of a fifth embodiment of the invention.
Figure 8:
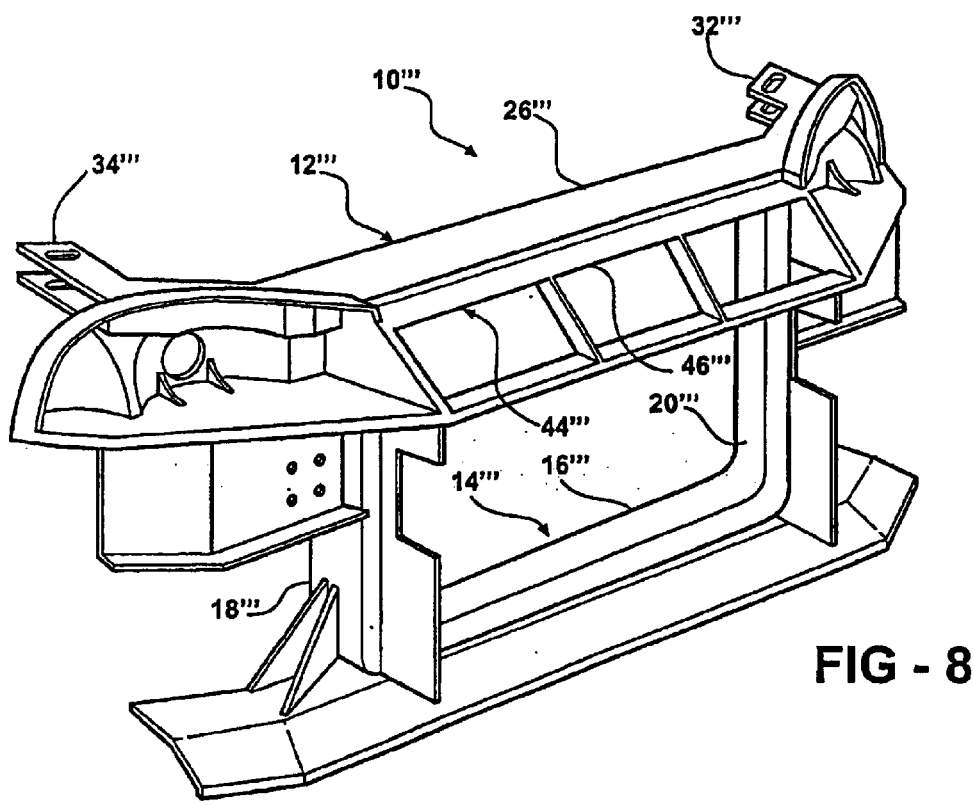
FIG. 8 is a perspective view of the fifth embodiment of the invention in complete form.

An additional crash energy attribute of the panel assembly 10 is in the design of the joint connections 32, 32", 34, 34", to the shotgun rails (not shown). The joint connections 32, 32", 34, 34", as shown in FIGS. 1 and 7, would hold the shotgun rails of the motor vehicle and be attached with a through bolt, thus coupling the two upper shotgun rails. Under an offset/high speed crash similar to that discussed above, the coupling of the upper shotguns enables the energy due to impact will be dissipated through each side of the motor vehicle.

Lastly, relative to energy management, the panel assembly 10 is advantageous in terms of pedestrian protection (upper leg/lower torso to grille/hood impact). These advantages may be attributed to the sandwich construction of the panel assembly 10, as it has the ability to distribute local loads and stresses over a large area. This equates to a lower HIC (head impact criteria) value upon pedestrian impact.

A mass comparison of the panel assembly 10 and the steel radiator structure for a typical passenger vehicle such as a midsize motor vehicle (a family sedan) yielded the following results: the steel radiator structure (upper rail portion only) weighed 6.6 pounds in comparison to 5.33 pounds for the panel assembly 10. The overall approximate weight of the steel radiator structure and panel assembly 10, without lamp canisters or integrated air deflectors, are 15.5 and 8.14 pounds, respectively. Therefore, improvements of energy dissipation are matched by the reduction in weight to the motor vehicle.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A panel assembly securable to a front end of a motor vehicle for positioning and securing a plurality of elements thereto, said panel assembly comprising:

an upper section defining a length extending between a driver end and a passenger end;

a lower section extending between an upper driver end and an upper passenger end, said upper driver and passenger ends fixedly secured to said length of said upper section; and a component mounting structure molded to said upper and lower sections, said component mounting structure adapted to have the plurality of elements secured thereto in spaced relation such that said panel assembly may be assembled to the motor vehicle with the plurality of elements secured to said panel assembly, characterized by said upper and lower sections each comprising a molded skin encapsulating a core.

2. A panel assembly as set forth in claim 1 wherein said skin includes a first skin portion and a second skin portion, said first skin portion covers a portion of said core and said second skin portion cooperates with said first skin portion, encapsulating said core.

3. A panel assembly as set forth in claim 2 wherein said core is fabricated of balsa wood.

4. A panel assembly as set forth in claim 3 wherein said skin includes carbon fiber.

5. A panel assembly as set forth in claim 4 wherein said upper section includes joint connections disposed at said driver end and said passenger end.

* * * * *